United States Patent [19]
Stone et al.

[11] 3,909,581
[45] Sept. 30, 1975

[54] DISPOSABLE RESISTANCE WELDING ELECTRODE

[75] Inventors: Carl A. Stone; Robert H. Imes; Peter C. Murphy, all of Indianapolis; Robert D. Thompson, Carmel, all of Ind.

[73] Assignee: P. R. Mallory & Co., Inc., Indianapolis, Ind.

[22] Filed: June 25, 1973

[21] Appl. No.: 373,167

Related U.S. Application Data

[63] Continuation of Ser. No. 251,508, May 8, 1972, which is a continuation of Ser. No. 99,417, Dec. 18, 1970.

[52] U.S. Cl. .................. 219/120; 219/75; 219/119
[51] Int. Cl. ..................... B23k 9/24; B23k 35/02
[58] Field of Search .................. 219/119, 120, 75

[56] References Cited
UNITED STATES PATENTS

| | | |
|---|---|---|
| 1,267,463 | 5/1918 | Schkommodau .............. 219/120 |
| 2,051,284 | 8/1936 | Ball ............................... 219/120 |
| 2,109,461 | 3/1938 | Brown ......................... 219/120 X |
| 2,446,932 | 8/1948 | Johnson ......................... 219/120 |
| 3,198,932 | 8/1965 | Weatherly ................... 219/120 X |
| 3,592,994 | 7/1971 | Ford .............................. 219/119 |

Primary Examiner—C. L. Albritton
Attorney, Agent, or Firm—Charles W. Hoffman; Robert F. Meyer; Donald W. Hanson

[57] ABSTRACT

This invention relates to a new type of resistance welding composite electrode which is disposable utilizing an inexpensive metal or alloy having good electrical and thermal conductivity as a holder, and a metal or alloy also having good electrical and thermal conductivity and in addition good strength at resistance welding operating temperatures for the insert tip.

5 Claims, 12 Drawing Figures

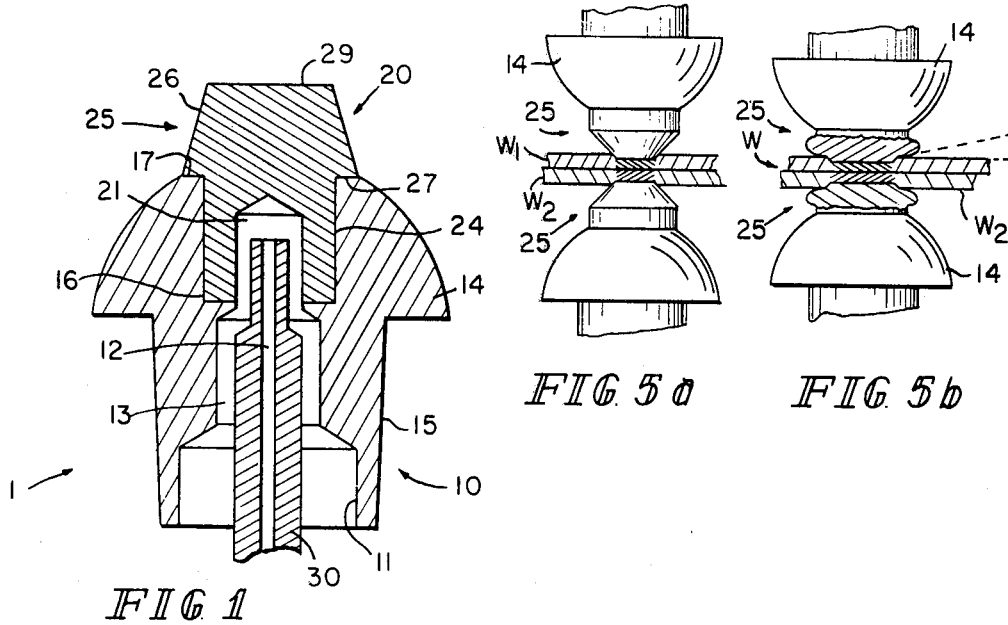
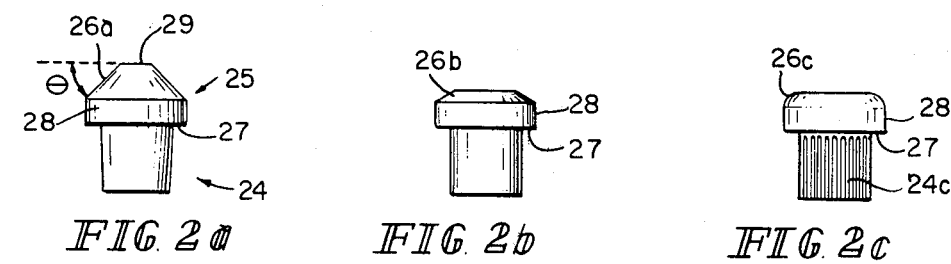
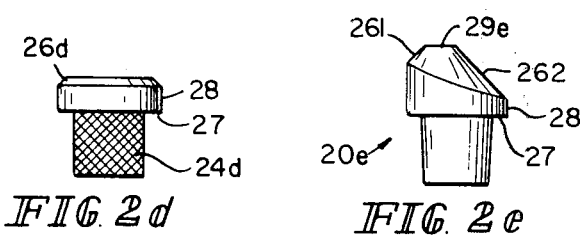
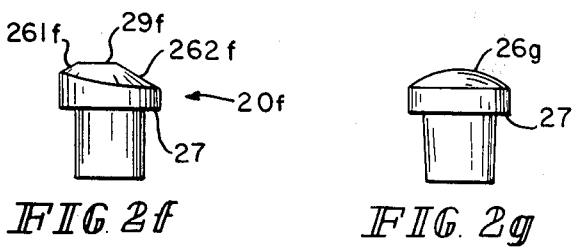

3,909,581

DISPOSABLE RESISTANCE WELDING ELECTRODE

This is a continuation of application Ser. No. 251,508, filed May 8, 1972 which in turn is a continuation of application Ser. No. 99,417, filed Dec. 18, 1970.

BACKGROUND

Over the years, many advances and improvements have been made in the materials and design of resistance welding electrodes.

The first major advance was in the development of copper base alloys which have high electrical and thermal conductivity and are resistant to annealing and deformation at the temperatures encountered in resistance welding operations. Alloys of copper-cadmium, copper-chromium, copper-zirconium, copper-cobalt-beryllium, copper-nickel-beryllium, and combinations of these alloys were found to be far superior to unalloyed copper. Even though such alloys were considerably more expensive, the life, or the number of welds that could be ootained between dressings, was such that resistance welding electrodes made from such copper alloys were more economical than unalloyed copper electrodes.

In the operation of resistance welders, it is necessary to use electrodes of various lengths and configurations. For example, some straight electodes may range up to several inches in length. The nose or face of the electrode that contacts the parts to be welded is the important section of the electrode and is the section that carries the current, applies the pressure and is intimately exposed to high temperature during the welding operation.

As a result of repeated welding operations, the nose of the electrode deforms. To those familiar with the art, this is called "mushrooming". As mushrooming progresses, the current density and/or pressure per unit area decrease unless adjustments are continuously made for these two factors. In most resistance welding operations, especially in automated set-ups, this is not practical.

Therefore, it is necessary to remove the electrode after some number of welding operations and redress the operating face, or nose, to its original contour. After a number of redressings, the entire electrode must be discarded.

The foregoing procedure is undesirable for one or more of the following reasons:
1. A substantial quantity of expensive copper alloy is wasted.
2. The redressing operation is time consuming expensive.
3. An inventory of expensive electrodes must be maintained for replacement while mushroomed electrodes are being redressed.

These factors are of importance to the automotive and appliance industries where most resistance welding operations are performed in automated equipment which is incorporated in assembly lines.

Some of the foregoing problems have been partly overcome by the development and use of so-called cap electrodes. In this design a short electrode which comprises the nose contour is fitted into or onto an adaptor of the requisite length. The cap may have an internal tapered section which fits over an external tapor on the adaptor, or an external taper which fits into an internal taper in the adaptor. In either design, the caps are of uniform length and nose contour. Usually these caps are removed from the adaptor and redressed several times because of dimensional change of the cap face. Once the cap electrode has served its useful life, it can be removed from the adaptor and discarded. Thus, only a small section of expensive copper alloy is discarded instead of a much longer length.

While the aforementioned solid copper alloy cap was a decided improvement over the older type solid welding electrode, it is a costly item when one considers that the automotive industry uses many thousands of such caps each day.

OBJECTS

It is, therefore, an object of the invention to provide an electrode that will be less costly than the present solid copper alloy cap electrode.

It is further an object of the invention to provide a new and different design for a cap electrode using a combination of materials that are easily fabricated by a number of methods.

It is also an object of the invention to provide a new and different cap electrode having a minimum volume of expensive copper alloy needed to perform a resistance welding operation.

SUMMARY OF THE INVENTION

The present invention comprises a new cap electrode having an insert tip inserted into a less expensive holding member. For example, aluminum or zinc or their alloys or other metals or alloys with adequate thermal and electrical conductivity may be used for the holding member into which is fitted a resistance welding insert which may be made of a metal or alloy having good electrical and thermal conductivity as well as good strength at resistance welding operation temperatures and pressures. The holder may have an internal or external taper for attachment to a male or a female adaptor used in a resistance welding machine.

THE DRAWINGS

FIG. 1 is a sectional view of an exemplary disposable resistance welding electrode in accordance with the present invention.

FIGS. 1a–2g illustrate exemplary insert shapes which may be utilized in the disposable electrode of the present invention.

Figures 3, 4:
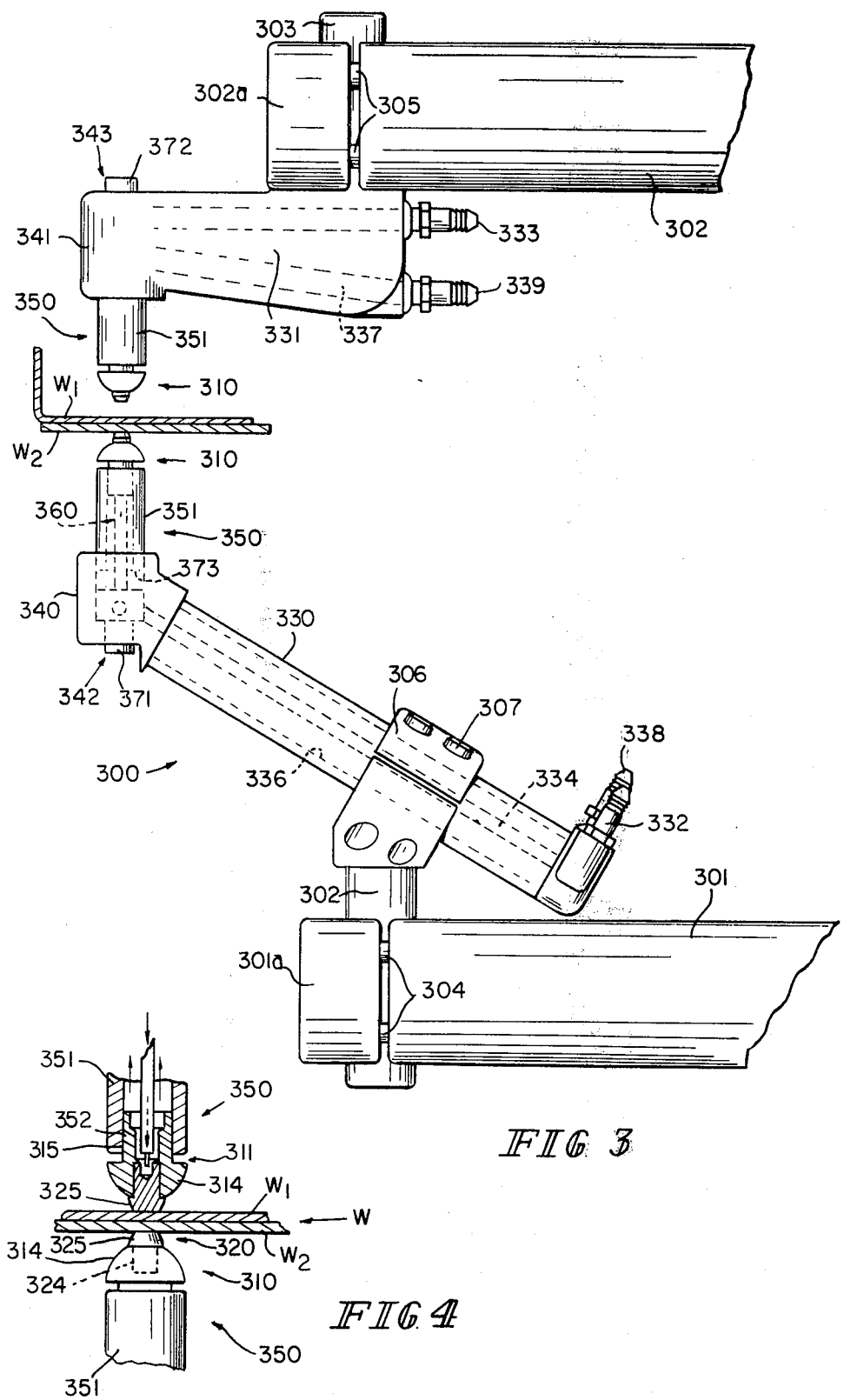
FIG. 3 is a view of an exemplary welding apparatus into which the disposable electrode of the present invention may be mounted.
FIG. 4 is an enlarged view showing the disposable electrodes in operation upon a work piece.

FIG. 5 a is a view of a resistance electrode according to the present invention at the beginning of operation; and FIG. 5 b is a view after operation has been carried out for a time illustrating how the metal moves along the taper in accordance with the present invention.

As can be seen from FIG. 1 the composite cap electrode of the present invention is indicated generally as 1 and comprises a holder member 10 and an insert member 20.

The holder member 10 may be made of any material having good electrical and thermal conductivity. It should be pointed out that the reason for utilizing a holder material which is different from the insert tip member 20 is one of cost. Therefore, the least expensive materials having sufficient electrical and thermal conductivity to conduct the current and remove heat from the electrode tips should be utilized. Additionally, some strength is required in this member because generally a pressure upwards of 600 pounds is utilized when the two electrode members are in contact with the work piece. Examples include aluminum and aluminum alloys, zinc and zinc base alloys preferably having at least 94% zinc by weight, iron and lower carbon iron. Particularly preferred are the 5,000 and 6,000 series of aluminum alloys and iron-carbon alloys having a carbon content below about 0.05 preferably below 0.02. Aluminum alloys which have been found to be particularly satisfactory alloys are EC, No. 2EC, 5005, 6061 and 6063 (Aluminum Association Designation). An exemplary zinc alloy is 4% – 0.04% Mg, optionally 1% Cu, - a die casting alloy.

It should be pointed out that other metals and alloys in addition to aluminum, zinc and their alloys may be used. For example, if the price of brass or bronze, Muntz Metal, was low enough to justify its use, these copper alloys have the necessary electrical and thermal conductivity and strength. However, as mentioned previously, it is strongly a question of economics as to which materials should be used for holder member 10.

Inserted within holder member 10 is a tip insert 20. Tip insert member 20 should be made of a material which has high electrical and thermal conductivity. Not only must tip insert member 20 have high electrical and thermal conductivity as was the case with holder member 10, but also relatively high strength at the operating temperature is necessary because a smaller cross-sectional area bears the force of upwards of 600 pounds utilized during operation for welding. Particularly satisfactory materials are copper and copper alloys. Exemplary alloying elements include chromium, zirconium, beryllium, cadmium and combinations of the foregoing up to about 3% total addition by weight. Particularly satisfactory alloys are copper alloys containing about 0.2 to 1.5% total of chromium and/or zirconium. Cadmium alloys may be used with chromium and/or zirconium in an amount up to about 0.5% by weight. Additionally, refractory metals such as tungston or molybdenum or alloys thereof, or tungsten or molybdenum infiltrated with copper or silver may be utilized in some applications. it should be pointed out that alloys of silver, gold or platinum could be utilized for tip insert 20; however, it is believed that under most economic conditions the cost of these metals would dictate strongly against their use.

Also, as can be seen from FIG. 1 the holder member 10 contains an opening for cooling fluid circulation 11. This fluid circulating opening of course comprises an inlet and an outlet defined in part by the wall of holder 10 and in part by hollow member 30. Hollow member 30 is a part of a conventional cooling system utilized in conventional resistance welding apparatus and equipment discussed further hereinafter regarding FIGS. 3 and 4. In the embodiment shown in FIG. 1 fluid is introduced through inside channel 12 and exists through channel 13. However, it will be obvious to those skilled in the art that channels 12 and 13 could be reversed or additional channels could be utilized, if desired.

The purpose of the fluid circulation is of course to effect cooling of the tip during welding operations. While water is the preferred fluid cooling medium, other liquids such as alcohol, or a gas such as air or nitrogen could be utilized if desired. It will hereinafter be assumed in this disclosure that the cooling medium utilized is water.

With some applications it is sufficient for water to be circulated within holder member 10. However, for other applications it is preferred that the water circulation continue into tip member 20. For this purpose a water opening 21 is provided. The water of course exits through channel 13. The heat removal is much more efficient when the cooling channel extends into the tip insert member 20.

For example, an amount of cooling water of 1 to 2 gallons per minute at room temperature per electrode is sufficient for cooling. These volumes may vary widely depending on water temperature and other conditions. As mentioned above, the use of other liquids or cooling gasses will dictate the use of other volumes to be circulated.

As to the shape of the composite cap 1 a wide variety of shapes for both the holder and the tip insert member may be utilized. However, certain shapes have been found to be preferable. It will be noted in FIG. 1 that the holder 10 has an enlarged portion of increased diameter 14. It will be apparent to those familiar with the economics of this type of member that the minimum amount of weight of metal is desired which will effect the best results. The enlarged portion 14 provides a heat sink to absorb excess heat transferred from insert member 20, that is not directly removed by the cooling fluid.

Particularly, in the embodiment where the water hole does not extend into tip insert 20 it is important to have a massive heat sink 14 to transfer heat from the tip insert to the water hole and cooling fluid.

it is possible to reduce the diameter as indicated at 15 and thus reduce the weight of holder member 10 and economize as much as possible on cost per pound of material. It should be pointed out however, that if the cost per pound of material for holder 15 is so small as to be negligible the entire member could have the same diameter as portion 14.

Turning now to the shape of tip 20, a number of conventional shapes for this member are given in FIGS. 2a through 2g. Any of these shapes or other shapes will function effectively as electrodes making good welds. However, one of the most preferred shapes for the tip insert is shown in FIGS. 1 and 2a. It will be apparent that the tip 20 shown in FIG. 1 includes an insert portion 24 which inserts into holder member 10. As mentioned previously, this insert portion 24 may or may not contain a water opening 21. While the cross section or the portion 24 may be any desired cross section, including square, rectangular, elliptical or any multi-sided cross section, from the standpoint of ease of manufacture a circular cross section is preferred.

The dimensions of the portion 24 are preferably sufficiently close to the dimensions of the opening 16 in element 10 as to provide a pressure fit. In accordance with one embodiment the dimensions are within approximately 0.02 inches of each other. For example, in the case of a circular cross section, the diameter of the opening 16 would differ from the diameter of the shank portion 24 of the tip insert by only ± about 0.02 inches. Thus, an effective pressure fit of up to 1000 pounds and higher can be achieved readily. In order to secure effective anchoring it is preferred that the length of shank portion 24 be at least approximately three-fourths of the length of tip portion 25 and preferably at least as long as tip portion 25. Alternatively tip 20 may be held in engagement by brazing to holder 10, by means of a tapered shank as shown in FIG. 2a, by means of knurls such as in FIG. 2d or splines as shown in FIG. 2c.

Tip portion 25 in the embodiment shown in FIG. 1 includes an external taper 26. The tapered portion 26 may comprise the entire thickness of the tip portion 25 and which the face 17 of the holder member seats against the shoulder 27 of the tip member. Alternatively, as shown in FIG. 2a, a portion 28 of constant diameter may be provided and shoulder 27 is a part of this constant diameter portion 28. The design shown in FIG. 2a is preferred where a large heat sink mass is to be provided.

It has been found that a mass of at least about 0.008 pounds is necessary for the effective welding and heat dissipation in portion 25 and tip member 20. Preferably, at least about 0.003 pounds of which is located in tip portion 25. Preferably about 0.005 pounds is located in the tip portion 25.

The angle of inclination of taper 26 is preferably within the range of 20° to 60° with respect to the horizontal $\theta$ in FIG. 2a, most preferably this angle is within the range 30° to 50°.

It is believed that the reason why the tapered design is effective is that during operation under pressures of about 600 pounds applied to an area of contact face 29 at 8000 to 12,000 amps the heat and pressure causes mushrooming at the contact face. However, with the tapered design the mushroom is considerably less. The metal rolls partially along taper 26 and the dimensions of contact face 29. This is illustrated in FIGS. 5a and 5b. Note in FIG. 5b how the metal has followed the taper instead of mushrooming according to the prior art.

As mentioned above, the composite cap is designed to be disposable. From the economic standpoint it should last for as many welds as conventionally are utilized in the copper or copper alloy electrodes prior to first dressing. Generally, this occurs between 2000 to 4000 welds.

For example over 4000 welds were achieved in a design shown in FIG. 2a using 6061 aluminum and a copper-chromium alloy tip wherein contact face 29 had a diameter of one-fourth inch, the distance of tapered portion 26 was 0.125 inches and the length of constant diameter portion 28 was about 0.5 inches. By contrast, a cylindrical shaped cap insert of one-fourth inch diameter and one-fourth inch long lasted for only about 1,300 welds with the same materials. However, the water circulation did not extend into the composite cap. This same design gave more than 1,500 welds but less than 1,600 welds when water was circulated into the aluminum alloy holder. It is believed that the other designs shown in FIGS. 2b through 2g will give up to 2,000 welds and higher at up to 600 pounds and higher pressure.

Regarding the embodiment shown in FIGS. 2b through 2g the following comments may be made; FIG. 2b differs from FIG. 2a in that the taper 26b is at a smaller angle and the thickness of taper portion 26b is less. In the embodiment shown in FIG. 2c a curvature is utilized in which the portion 26c is not a taper but a curved surface. Note also the use of splines 24c for attachment to holder 10 in FIG. 2c. In FIG. 2d the taper portion 26d is greatly reduced in size; therefore a large massive portion 28 is required in order to have a sufficient heat sink to remove the heat during welding. Note also the use of knurls 24d for attachment to holder 10 in FIG. 2d. In the embodiments shown in FIGS. 2e and 2f the tip 20e is composed of sides on offset face 29e having sides of unitarily varying lengths 261 and 262. In the embodiment in FIG. 2g the portion 26g comprises a rounded radius.

The reason for illustrating the various embodiments shown in FIGS. 2a through 2g is to allow welding of various geometric shapes which may be encountered in various applications. These various designs are intended by way of example only and are not in any way to be considered limiting. Rather it will be apparent to those skilled in the welding art that a wide variety of additional and different geometries may be utilized in accordance with the teachings of the present invention.

FIG. 3 shows an exemplary conventional welding machine in which the composite cap of the present invention may be utilized. The machine is generally indicated at 300 and comprises two welding arms, 301 and 302, each of which is affixed to an appropriate mounting spindle or base (not shown). Welding arm adaptors 302 and 303 are inserted within welding arms 301 and 302 by appropriate means such as bolts, indicated respectively as 304 and 305, by passing through one end of each of the welding arms 301a and 302a. A clamp 306 is utilized to hold an operating arm 330 by appropriate means such as a bolt 307. Similarly, welding arm adaptor 303 holds in place a second operating arm 331 by appropriate means such as bolts (not shown). The operating arms are made of any suitable metal or alloy for example, copper, aluminum, steel or brass, and may comprise a water cooling system including water inlets 332 and 333. The inlets 332 and 333 connect with inner conduits 334 and 335. These operating arms also include outlet conduits 336 and 337 each of which connects with water outlets 338 and 339.

Adaptor members 340 and 341 by appropriate means such as bolts (not shown) hold in place electrode members 350. Adaptor members 340 and 341 further comprise a hollow member or tube 360 which corresponds to tube 30 in FIG. 1. This tube passes within and cooperates with shank member 351 to define channels for carrying cooling fluid to hollow member 310. These adaptor members 340 and 341 further comprise a mechanism 342 and 343 for extracting electrode member 350. A blow is applied to extractor heads 371 and 372. These members move downward and contact upper shank face 373 of shank 351, moving the shank, holder 310 and insert tip 320 downwardly and out of engagement with adaptors 340 and 341. It should be mentioned at this point that a wide variety of welding arms, operating arms and adaptors with appropriate passages for cooling fluid may be utilized in cooperation with electrode members 350 so that members 350 are appropriately positioned with respect to the work pieces W1 and W2, and cooling fluid available. The appropriate welding arms, operating arms, adaptors and cooling fluid passages may be the same or different on either side of the work piece as will most easily facilitate getting the electrode members appropriately positioned on each side of the work piece.

The electrode members 350 comprise hollow shank members 351 to which are appropriately affixed the composite cap electrodes of the present invention. As can be seen from FIG. 4 the shank members 351 comprise hollow conductive members having openings therein 352. The lower portion of openings 352 is tapered to receive holder members 311. Tapered portion 352 receives portion 315 on a holder member which is cooperatively tapered for appropriate fitting. Insert tip 320 comprising shank portion 324 and tip portion 325 is appropriately placed in holder member 311. Tip portions 325 are both in engagement with work piece W1 and W2 in order to weld the same together to form a unitary welded article W.

As mentioned previously, the various welding arms, operating arms, adaptors, together with appropriate cooling fluid systems are conventional and it will be apparent to those skilled in the art that a wide variety of such constructions may be designed in order to utilize the composite disposable cap of the present invention.

Additionaly, the concept of the present invention may also be utilized in other resistance welding members for example in circular members such as a seam welding member, wherein the insert may be placed in the outer periphery of the outer electrode.

A wide variety of methods of fabrication may be utilized to form the composite cap of the present invention and this invention is not to be construed as limited by the method of fabrication. However, the following methods of fabrication will be mentioned as examples.

First, with respect to the insert tip, this may be formed for example by appropriate machining of solid rods. Such machining operations are conventional in manufacturing facilities. One draw-back to machining this part is that it is expensive as compared to other methods of manufacture and many of those skilled in the art will recognize that this method may not be the most economical.

Another method which may be utilized to form the insert is to die cast the insert to shape. The die casting art is highly developed, and complicated as well as simple configurations may be die cast and a large number may be cast in each die casting shot. At present this appears to be a more economical method of making the inserts than machining.

Still another method for making the inserts involves cold heading or impact extrusion. Generally this would involve cutting off a piece of coiled wire prior to the extrusion operation, and then this piece is extruded to final dimensions. These operations are generally carried out automatically in known heading or extrusion machines.

Finally, the insert may be formed by pressing and sintering of powder to final shape. Those skilled in the art are aware of the pressing pressures and sintering temperatures necessary to form strong and dimensionally accurate shapes in this fashion.

The holder may be formed in any of the above methods. However, the following comments will be made concerning the method of forming the holder.

Since the holder is a hollow member, in addition to extrusion from coiled wire, the holder could be extruded from hollow rod. Machines for carrying out this type of operation are conventional and known to those skilled in the art.

With regard to pressing and sintering method, the insert tip could be placed in position and then the holder member in powder form inserted and pressed and sintered around the insert to form the composite cap of the present invention in this fashion. A strong bond would be formed during the sintering operation between the holder and the insert.

It is also believed that the insert could be used as an insert in a die casting operation and the holder die-cast around the insert with appropriate mold and cavity design. This would constitute a particularly efficient and economical method of forming the composite cap of the present invention. Other methods of manufacture may be apparent to those skilled in the manufacturing art.

We claim:

1. A composite disposable resistance electrode cap comprising a holder member having an enlarged metal containing section, the metal of the metal containing holder member selected from the group consisting of Al, Al alloys, Fe, Fe alloys, and Zn and Zn alloys, and a metal containing tip having a substantially flat contact face adapted to engage with a workpiece and an external taper gradually reducing in cross sectional dimension toward the contact face, the tip having a portion retained in an aperture of the enlarged section of the holder member to close an end of the aperture and so that the thermal and electrical conductivity are possible between the tip and the enlarged section of the holder member, the metal of the metal containing tip selected from the group consisting of Cu, Cu alloys, W, W alloys, Mo, Mo alloys, Ag alloys, Au alloys and Pt alloys.

2. The electrode cap of claim 1, including means capable of causing fluid to flow into the aperture of the holder member and adjacent the tip.

3. The electrode cap of claim 1, wherein the taper is at an angle of from about 20° to about 60° with respect to the horizontal.

4. The electrode cap of claim 3, wherein the taper angle is from about 30° to about 60°.

5. The electrode cap of claim 1, wherein the taper is curved.

* * * * *

UNITED STATES PATENT OFFICE
CERTIFICATE OF CORRECTION

PATENT NO. : 3,909,581
DATED : September 30, 1975
INVENTOR(S) : Carl A. Stone, Robert H. Imes, Peter C. Murphy & Robert D. Thompson It is certified that error appears in the above-identified patent and that said Letters Patent are hereby corrected as shown below:

Col. 1, line 23, delete "ootained" and substitute therefore ---obtained---

Col. 1, line 52, insert "and" after consuming

Col. 2, line 46, delete "1a" and substitute therefore ---2a---

Col. 4, line 37, delete "it" and substitute therefore ---It---

Col. 7, line 9, delete "piece" and substitute therefore ---pieces---

Signed and Sealed this third Day of February 1976

[SEAL]

Attest:

RUTH C. MASON
*Attesting Officer*

C. MARSHALL DANN
*Commissioner of Patents and Trademarks*